(12) United States Patent
Chubak

(10) Patent No.: US 10,247,215 B2
(45) Date of Patent: Apr. 2, 2019

(54) ASSEMBLY JOINER

(71) Applicant: Albert Chubak, Murray, UT (US)

(72) Inventor: Albert Chubak, Murray, UT (US)

( * ) Notice: Subject to any disclaimer, the term of this patent is extended or adjusted under 35 U.S.C. 154(b) by 406 days.

(21) Appl. No.: 15/136,694

(22) Filed: Apr. 22, 2016

(65) Prior Publication Data
US 2016/0238047 A1 Aug. 18, 2016

Related U.S. Application Data

(63) Continuation-in-part of application No. 14/118,500, filed as application No. PCT/US2012/039584 on May 25, 2012, now abandoned.

(60) Provisional application No. 61/490,728, filed on May 27, 2011.

(51) Int. Cl.
- F16B 5/06 (2006.01)
- F16B 12/46 (2006.01)
- F16B 7/04 (2006.01)

(52) U.S. Cl.
CPC ............ *F16B 5/0614* (2013.01); *F16B 12/46* (2013.01); *F16B 7/048* (2013.01)

(58) Field of Classification Search
CPC .............. E04B 1/2403; E04B 1/2608; E04B 2001/2644; E04B 2001/405; E04B 2002/867; F16B 5/0614; F16B 2005/0678; F16B 12/46; F16B 7/048; A47E 5/005
USPC ................. 52/582.1, 282.2, 712; 403/205
See application file for complete search history.

(56) References Cited

U.S. PATENT DOCUMENTS

| | | | | |
|---|---|---|---|---|
| 1,758,955 A | * | 5/1930 | Lovejoy | E06B 9/52 403/205 |
| 3,343,329 A | * | 9/1967 | Pohutsky | E04B 9/22 165/49 |
| 4,016,612 A | * | 4/1977 | Barile, Sr. | A47C 19/021 211/182 |
| 4,870,711 A | * | 10/1989 | Felix | A47C 19/005 403/205 |
| 5,170,977 A | | 12/1992 | McMillan | |
| 5,676,486 A | | 10/1997 | Keith | |

(Continued)

FOREIGN PATENT DOCUMENTS

| | | |
|---|---|---|
| DE | 3627016 A1 | 2/1988 |
| JP | 05-294430 | 11/1993 |
| KR | 20-0266581 | 3/2002 |

*Primary Examiner* — Amber R Anderson
*Assistant Examiner* — Nahid Amiri
(74) *Attorney, Agent, or Firm* — Kunzler, PC

(57) ABSTRACT

For joining assemblies, an apparatus includes a bracket, planar supports, and a restraining hook. The bracket includes a first bracket plate and a second bracket plate. The first bracket plate is physically connected to the second bracket plate and is disposed at a specified interior angle to the second bracket plate. Each planar support is formed by bending a corresponding bracket plate inward along a support outer bend as a substantially right angle to the bracket plate, with the planar support disposed toward an interior of the bracket. The restraining hook is in physical communication with the second bracket plate. The restraining hook includes a first hook plate disposed substantially perpendicular to the second bracket plate and a second hook plate in physical communication with the first hook plate and disposed substantially parallel to the second bracket plate.

8 Claims, 17 Drawing Sheets

(56) References Cited

U.S. PATENT DOCUMENTS

| | | | | |
|---|---|---|---|---|
| 6,230,467 B1* | 5/2001 | Leek | ............... | E04B 1/2403 |
| | | | | 403/232.1 |
| 6,295,781 B1 | 10/2001 | Thompson | | |
| 6,352,382 B1* | 3/2002 | Hatlan | ............... | F16B 12/46 |
| | | | | 403/205 |
| 6,415,575 B1* | 7/2002 | Thompson | ............ | E04B 1/2608 |
| | | | | 52/712 |
| 6,925,666 B2* | 8/2005 | Harrow | ............ | A47C 19/005 |
| | | | | 5/201 |
| 7,178,305 B2* | 2/2007 | Petrova | ............ | F16B 15/0046 |
| | | | | 52/714 |
| 7,941,989 B2* | 5/2011 | Morsching | ............ | E04D 13/15 |
| | | | | 248/124.1 |
| 8,402,577 B2* | 3/2013 | Harrow | ............ | A47C 19/005 |
| | | | | 5/201 |
| 8,484,927 B2* | 7/2013 | Nguyen | ............ | E04B 7/063 |
| | | | | 52/714 |
| 2002/0116890 A1 | 8/2002 | Moore, Jr. | | |
| 2014/0090228 A1* | 4/2014 | Chubak | ............ | A47B 87/02 |
| | | | | 29/428 |
| 2014/0290136 A1* | 10/2014 | Vaughn | ............ | A01G 9/02 |
| | | | | 47/66.1 |

* cited by examiner

ASSEMBLY JOINER

CROSS-REFERENCE TO RELATED APPLICATION

This application is a continuation-in-part that claims priority to U.S. patent application Ser. No. 14/118,500 entitled "ASSEMBLY JOINTER" and filed on Nov. 18, 2013 for Albert Chubak, which is incorporated herein by reference, and which claims priority to U.S. Provisional Patent Application No. 61/490,728 entitled "ASSEMBLY JOINER" and filed on May 27, 2011 for Albert Chubak, which is incorporated herein by reference.

FIELD

The subject matter disclosed herein relates to an assembly joiner and more particularly relates to an assembly joiner for joining panels.

BACKGROUND

Description of the Related Art

It is often useful to join sheets, planks, panels, boards, and similar material, referred to herein as panels, at a joint. In the past, brackets have been used to join panels. However, the brackets typically required fasteners to connect the brackets to the panels. In addition, creating a connection has often been time-consuming.

SUMMARY

An apparatus is disclosed for joining assemblies that includes a bracket, planar supports, and a restraining hook. The bracket includes a first bracket plate and a second bracket plate. The first bracket plate is physically connected to the second bracket plate and is disposed at a specified interior angle to the second bracket plate. Each planar support is formed by bending a corresponding bracket plate inward along a support outer bend as a substantially right angle to the bracket plate, with the planar support disposed toward an interior of the bracket. The restraining hook is in physical communication with the second bracket plate. The restraining hook includes a first hook plate disposed substantially perpendicular to the second bracket plate and a second hook plate in physical communication with the first hook plate and disposed substantially parallel to the second bracket plate.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

The schematic flowchart diagrams and/or schematic block diagrams in the Figures illustrate the architecture, functionality, and operation of possible implementations of apparatuses according to various embodiments. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. The description of each figure may refer to elements in previous figures, like numbers referring to like elements.

Figure 1A:
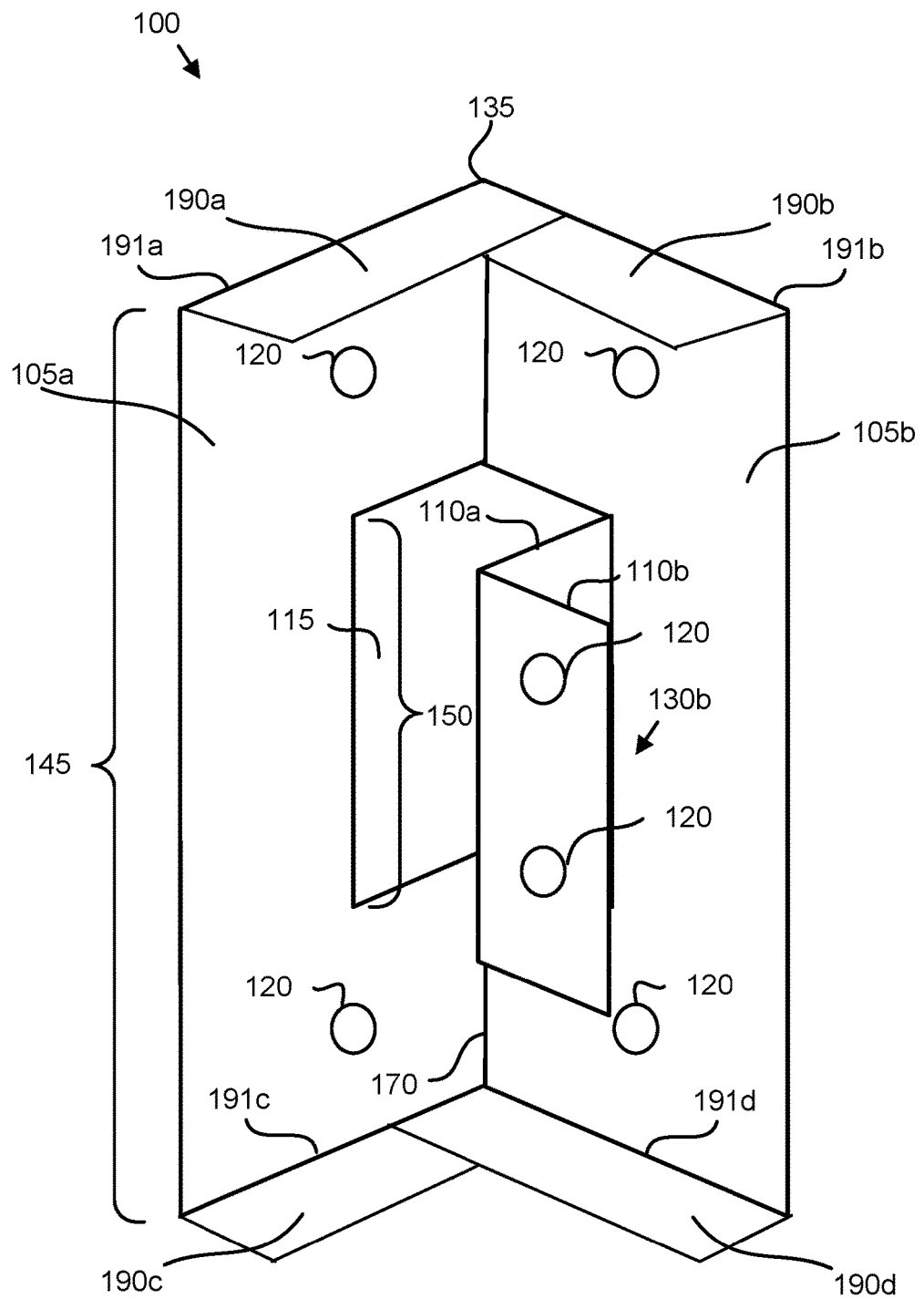
FIG. 1A is a perspective drawing illustrating one embodiment of an assembly joiner.

FIG. 1A is a perspective drawing illustrating one embodiment of an assembly joiner 100. The assembly joiner 100 includes a bracket 135 comprising a first bracket plate 105a and a second bracket plate 105b. The first bracket plate 105a is physically connected to the second bracket plate 105b and is disposed at a specified interior angle to the second bracket plate 105b. In one embodiment, the first bracket plate 105a is physically connected to the second bracket plate 105b along a corner bend 170. The assembly joiner 100 may include an outer height 145 and an inner height 150.

The assembly joiner 100 further includes a restraining hook 130. The restraining hook 130 is in physical communication with the second bracket plate 105b. The restraining hook 130 comprises a first hook plate 110a disposed in physical communication with and substantially perpendicular to the second bracket plate 105b and a second hook plate 110b. The second hook plate 110b is in physical communication with the first hook plate 110a and is disposed substantially parallel to the second bracket plate 105a. The term substantially perpendicular as used herein refers to within 20° of perpendicular. The term substantially parallel as used herein refers to within 20° of parallel. The first hook plate 110a has a panel width 160 and the second hook plate 110b has a hook width 155.

Although the assembly joiner 100 may connect to or more panels without fasteners as will be described hereafter, in one embodiment the joiner 100 includes one or more fastener holes 120. A fastener may be positioned in a fastener hole 120 to more securely connect a panel to a bracket plate 105a-b and/or to a hook plate 110a-b. The fastener hole 120 may be threaded. In one embodiment, the joiner 100 includes an orifice 115.

The bracket 135 also includes at least two planar supports 190. Each planar support 190 may be formed by cutting a bracket plate 105 and bending the bracket plate 105 inward along a support outer bend 191. The bracket plate 105 may be punched and/or laser cut to form the planar support 190. In the depicted embodiment, the first bracket plate 105a is physically connected to planar supports 190a/c along support outer bends 191a/c while the second bracket plate 105b is physically connected to planar supports 190b/d along support outer bends 191b/d.

A first planar support 190a is physically connected to a first support outer bend 191a of the first bracket plate 105a and forms a substantially right angle to the first bracket plate 105a. As used herein, a substantially right angle is 90 degrees plus or minus five degrees. The first planar support 190a is disposed toward an interior of the bracket 135. A third planar support 190c is physically connected through a second outer bend 191c of the first bracket plate 105a and forms a substantially right angle to the first bracket plate 105a. The third planar support 190c is disposed toward the interior of the bracket 135. A second planar support 190b is physically connected to a second outer bend 191b of the second bracket plate 105b and forms a substantially right angle to the second bracket plate 105b. The second planar support 190b is disposed toward the interior of the bracket 135. The first planar support 190a and the second planar support 191b overlap. A fourth planar support 190d is physically connected to a support outer bend 191d of the second bracket plate 105b and forms a substantially right angle to the second bracket plate 105b. The fourth planar support 190d is disposed toward the interior of the bracket 135. The third planar support 190c and the fourth planar support 190c overlap.

An upper planar supports 190a/c may receive a load from a panel or another planar support and transmit the load through the bracket plates 105a-b to lower planar supports 190b/d. Thus, the bracket 135 may carry loads for panels. As a result, panels with low load carrying capabilities may be used in a load carrying assembly.

In one embodiment, the assembly joiner 100 is stamped and formed from a sheet of metal. Alternatively, the assembly joiner 100 may be extruded plastic.

Figure 1B:
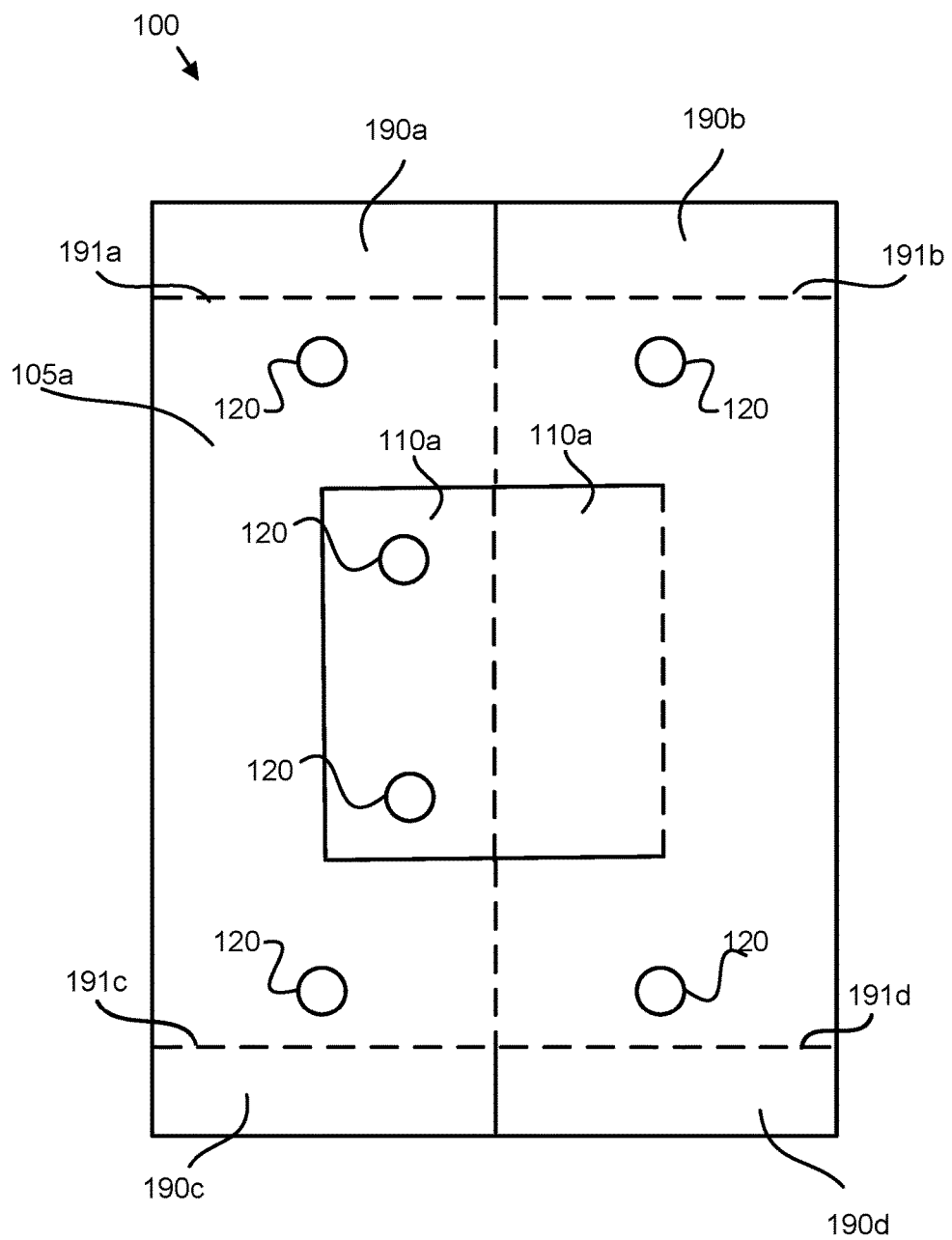
FIG. 1B is a top view drawing illustrating one embodiment of an assembly joiner.

FIG. 1B is a top view drawing illustrating one embodiment of the assembly joiner 100 of FIG. 1B prior to bending. In the depicted embodiment, the assembly jointer 100 is formed from a single sheet of metal. Cuts are shown as solid lines and bend sites are shown as dotted lines.

Figure 1C:
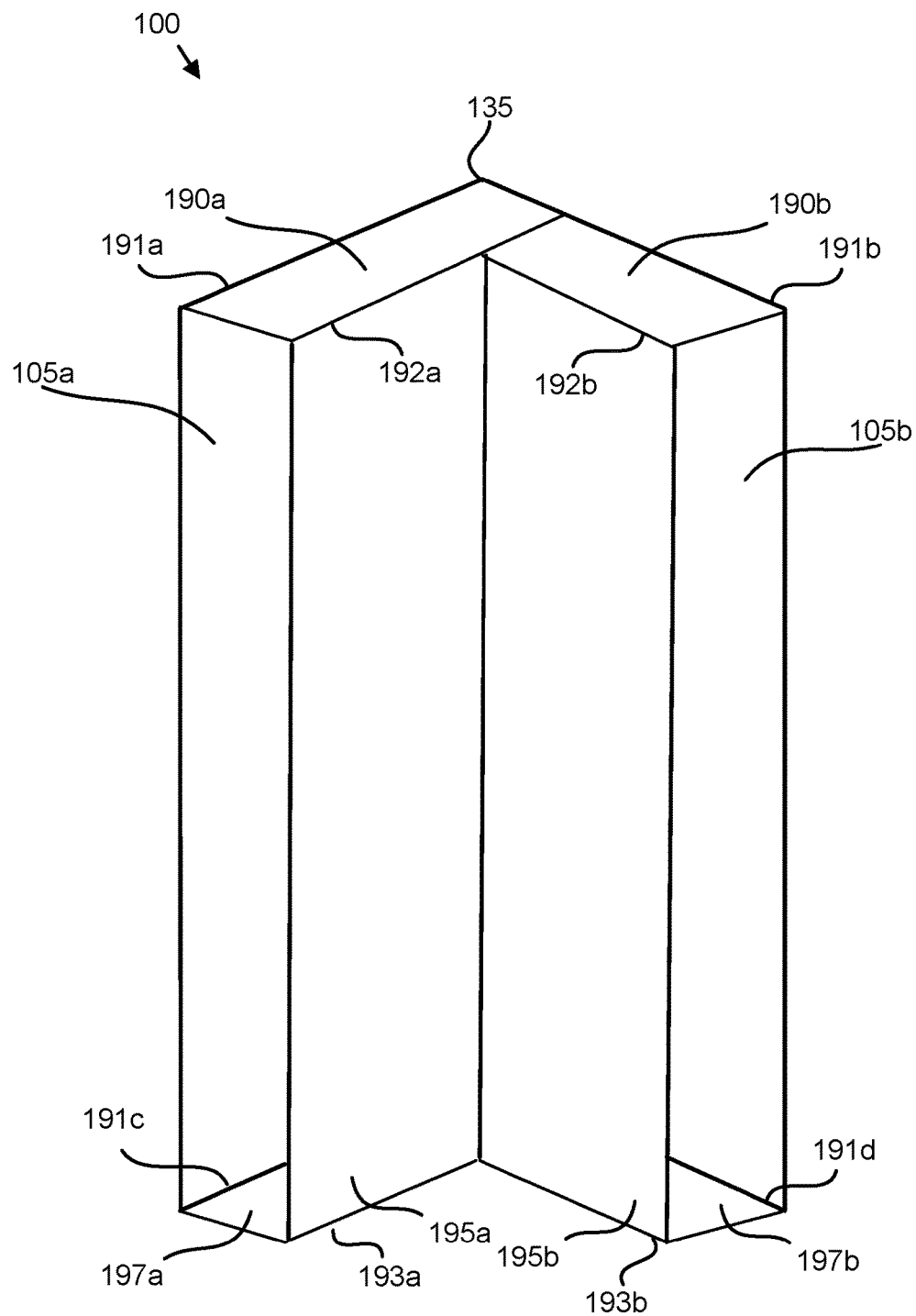
FIG. 1C is a perspective drawing illustrating one alternate embodiment of an assembly joiner.

FIG. 1C is a perspective drawing illustrating one alternate embodiment of an assembly joiner 100. In the depicted embodiment, a first inner bracket plate 195a is bent inward at a first support inner bend 192a from the first planar support 190a and provides support for the load on the first planar support 190a at the interior of the bracket 135. A second inner bracket plate 195b is bent inward at a second support inner bend 192b from the second planar support 190b and also provides support at the interior of the bracket 135 for the second planar support 190b.

In one embodiment, a first inner planar support 197a is bent outward at a first support base bend 193a of the first inner bracket plate 195a. The first inner planar support 197a may be disposed adjacent to and/or overlap the third planar support 190c. The first inner planar support 197a may transmit the load from the first planar support 190a and the inner bracket plate 195a. A second inner planar support 197b may be bent outward at a second support base bend 193b from the second inner bracket plate 195b. The second inner planar support 197b may be disposed adjacent to and/or overlap the fourth planar support 190d. The second inner planar support 197b may transmit the load from the second planar support 190b and the second inner bracket plate 195b.

Figure 1D:
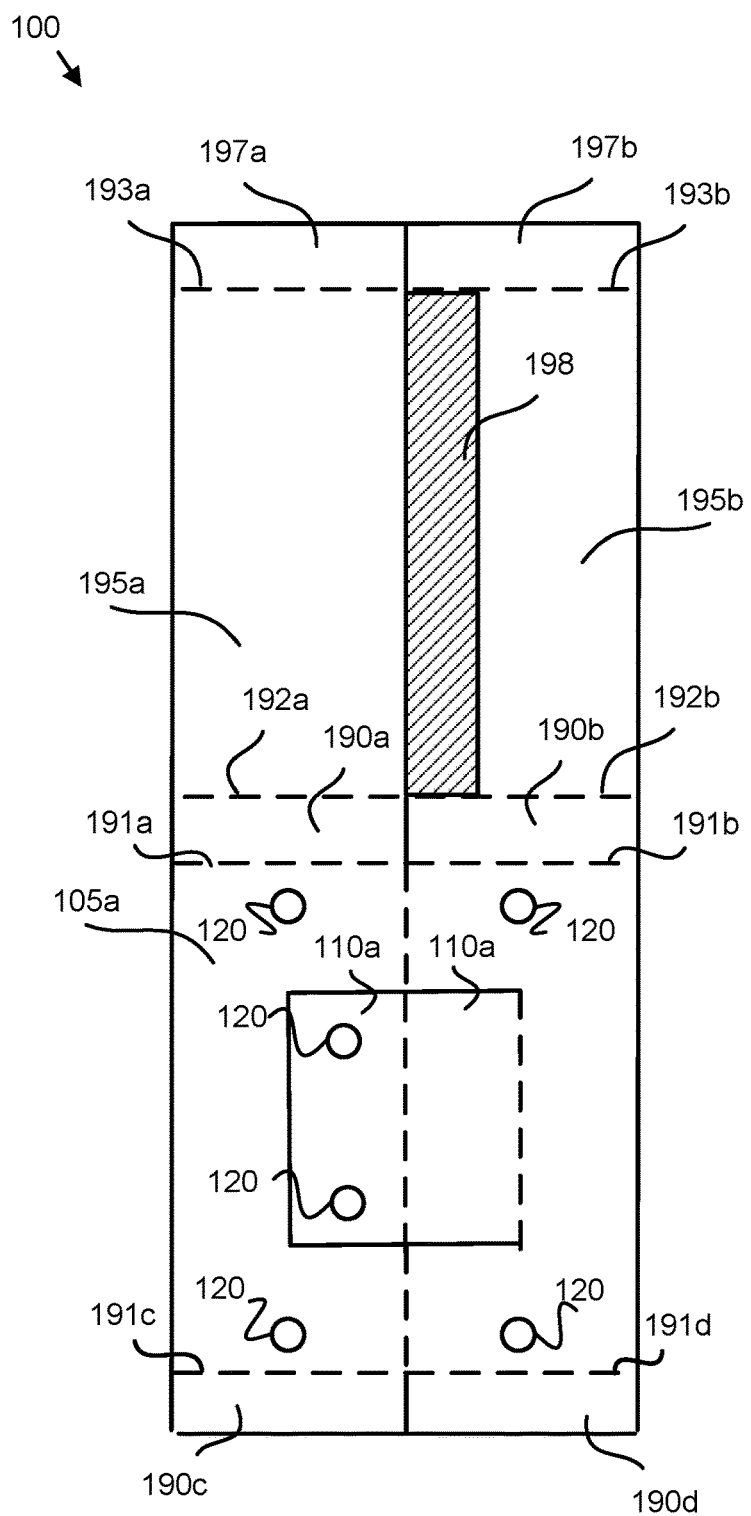
FIG. 1D is a top view drawing illustrating one embodiment of the assembly joiner of FIG. 1C prior to bending.

FIG. 1D is a top view drawing illustrating one embodiment of the assembly joiner 100 of FIG. 1C prior to bending. In the depicted embodiment, the assembly jointer 100 is formed from a single sheet of metal. Cuts are shown as solid lines and bend sites are shown as dotted lines. Cuts may be punched and/or laser cut. A portion of material 198 may be removed from the second inner bracket plate 195b to prevent the second inner bracket plate 195b from impinging on the first inner bracket plate 195a.

Figure 2:
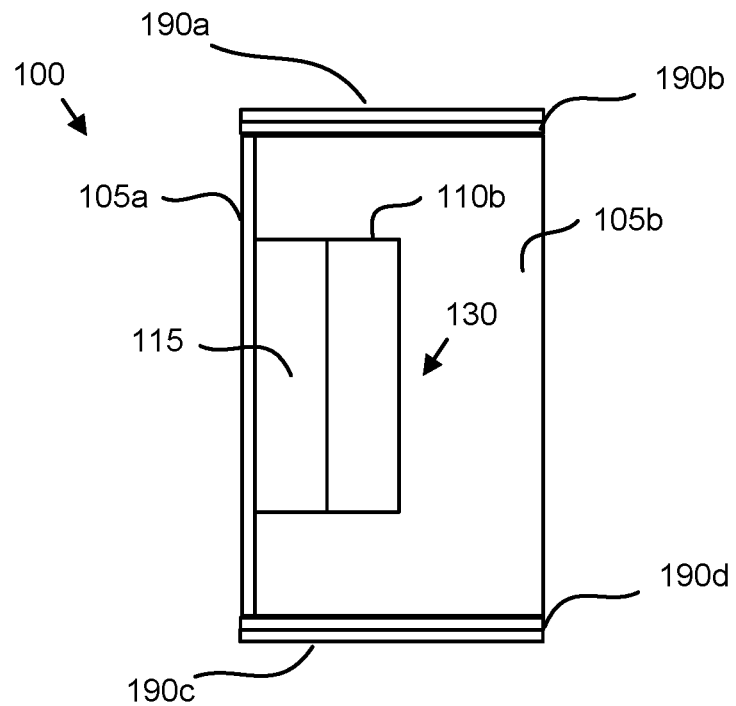
FIG. 2 is a side view drawing illustrating one embodiment of an assembly joiner.

FIG. 2 is a side view drawing illustrating one embodiment of an assembly joiner 100. The assembly joiner 100 may be the assembly joiner 100 of FIG. 1. The description of the assembly joiner 100 refers to elements of FIG. 1, like numbers referring to like elements.

In one embodiment, the bracket 135 and the restraining hook 130 are formed from the single piece. The restraining hook 130 may be punched and/or laser cut from the bracket 135.

In one embodiment, the bracket 135 and the restraining hook 130 are formed of a material selected from metal, plastic, epoxy resin, corrugated paper, bonded carbon fibers, fabric, epoxy stiffened fabric, concrete, reinforce concrete epoxy concrete, wood, compressed organic material, compressed biodegradable material and combinations thereof.

Figure 3:
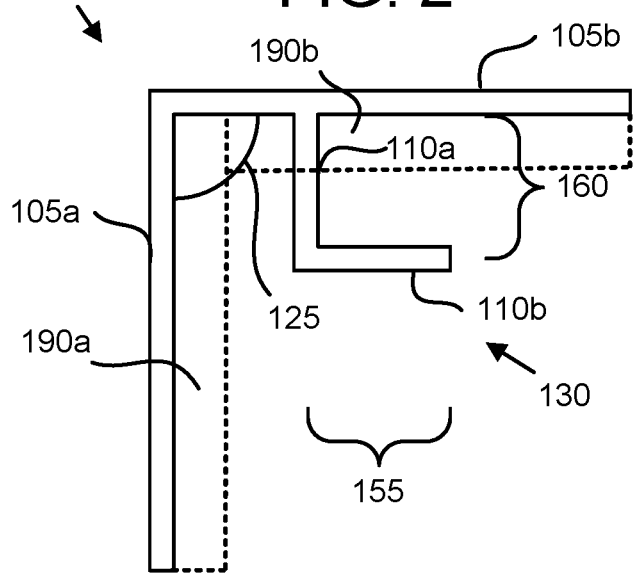
FIG. 3 is a top view drawing illustrating one embodiment of an assembly joiner.

FIG. 3 is a top view drawing illustrating one embodiment of an assembly joiner 100. The assembly joiner 100 may be the assembly joiners 100 of FIGS. 1-2. The description of the assembly joiner 100 refers to elements of FIGS. 1-2, like numbers referring to like elements. The restraining hook has a panel width 160 and a hook width 155.

The outer height 145, inner height 150, panel width 160, and hook width 155, may be selected to support specified panel configurations. Table 1 lists ranges of the outer height 145, inner height 150, panel width 160, and hook width 155 for specified panels.

TABLE 1

| Panel Height | Outer Height | Inner Height | Panel Width | Hook Width |
|---|---|---|---|---|
| 24.4 cm | 20-24.4 cm | 3-18 cm | 1.9 cm | 0.8-3.6 cm |
| 16.7 cm | 12-16.7 cm | 5-12 cm | 1.9 cm | 0.8-3.6 cm |
| 14.3 cm | 12-14.3 cm | 2.5-10 cm | 1.9 cm | 0.8-3.6 cm |
| 11.4 cm | 8-11.4 cm | 2-7.5 cm | 1.9 cm | 0.8-3.6 cm |
| 8.9 cm | 6-8.9 cm | 2.5-5.5 cm | 3.8 cm | 1.6-7.4 cm |
| 14 cm | 12-14 cm | 3-10 cm | 3.8 cm | 1.6-7.4 cm |
| 18.4 cm | 14-18.4 cm | 4-12 cm | 3.8 cm | 1.6-7.4 cm |
| 23.5 cm | 19-23.5 cm | 5-15 cm | 3.8 cm | 1.6-7.4 cm |
| 28.6 cm | 23-28.6 cm | 6-21 cm | 3.8 cm | 1.6-7.4 cm |
| 121.9 cm | 80-121.9 cm | 3-100 cm | 1.3 cm | 0.6-2.4 cm |
| 121.9 cm | 80-121.9 cm | 3-100 cm | 1.9 cm | 0.8-3.6 cm |
| 121.9 cm | 80-121.9 cm | 3-100 cm | 2.5 cm | 1-4.8 cm |
| 121.9 cm | 80-121.9 cm | 3-100 cm | 3.8 cm | 1.6-7.4 cm |
| 243.8 cm | 160-243.8 cm | 6-150 cm | 1.3 cm | 0.6-2.4 cm |
| 243.8 cm | 160-243.8 cm | 6-150 cm | 1.9 cm | 0.8-3.6 cm |
| 243.8 cm | 160-243.8 cm | 6-150 cm | 2.5 cm | 1-4.8 cm |
| 243.8 cm | 160-243.8 cm | 6-150 cm | 3.8 cm | 1.6-7.4 cm |
| 274.3 cm | 180-274.3 cm | 6-160 cm | 1.3 cm | 0.6-2.4 cm |
| 274.3 cm | 180-274.3 cm | 6-160 cm | 1.9 cm | 0.8-3.6 cm |
| 274.3 cm | 180-274.3 cm | 6-160 cm | 2.5 cm | 1-4.8 cm |
| 274.3 cm | 180-274.3 cm | 6-160 cm | 3.8 cm | 1.6-7.4 cm |

A specified interior angle 125 between the first bracket plate 105a and a second bracket plate 105b is shown. In one embodiment, the interior angle 125 is substantially 90°. Substantially a specified angle as used herein refers to an angle within 10° of the specified angle. In an alternate embodiment, the specified angle is selected from the group consisting of 30°, 32.7°, 36°, 40°, 45°, 52.4°, 60°, 72°, and 120°.

Figure 4:
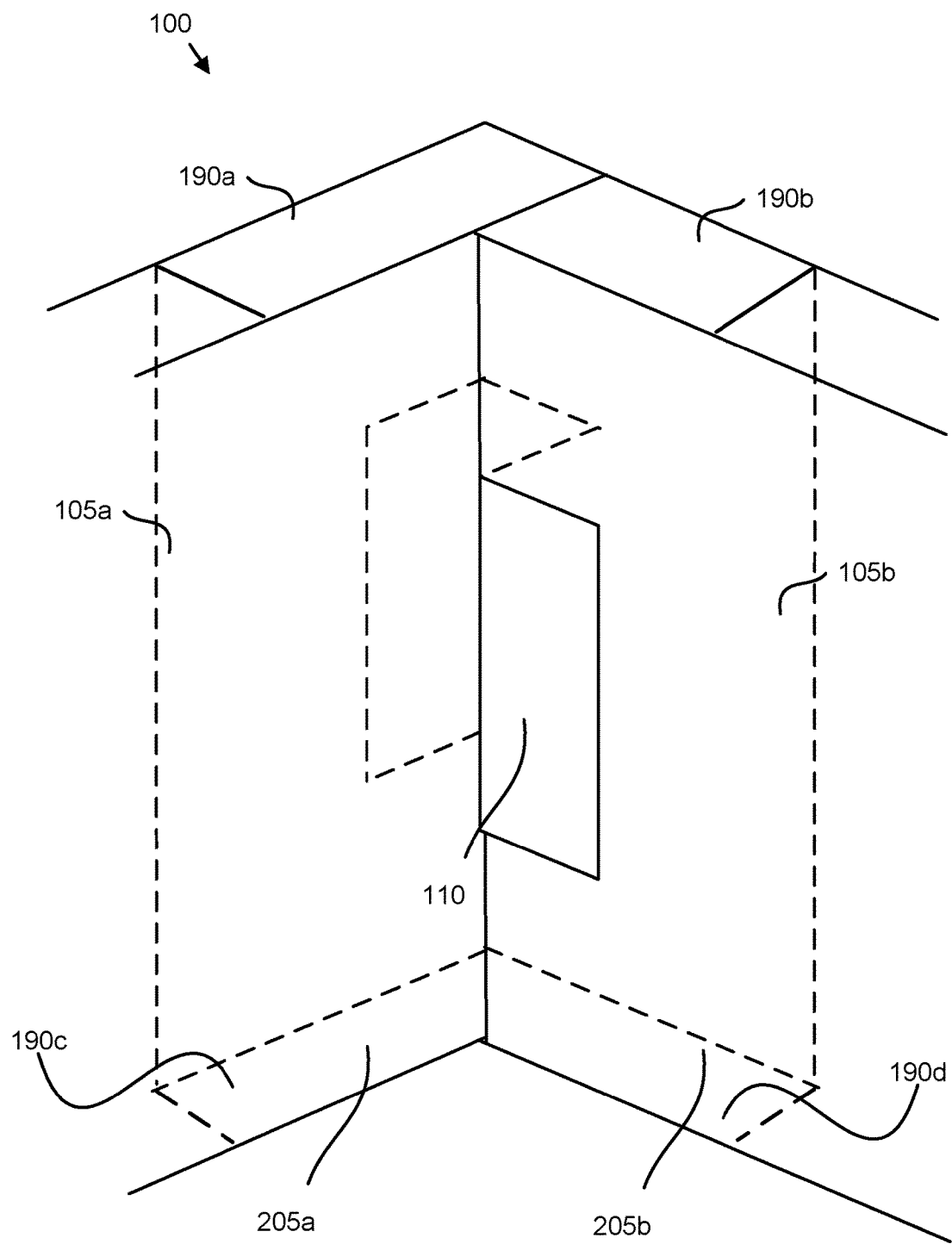
FIG. 4 is a perspective drawing illustrating one embodiment of an assembly joiner connecting panels.

FIG. 4 is a perspective drawing illustrating one embodiment of an assembly joiner 100 connecting panels 205. The assembly joiner 100 may be the assembly joiners 100 of FIGS. 1-3. The description of the assembly joiner 100 refers to elements of FIGS. 1-3, like numbers referring to like elements.

A first panel 205 is disposed parallel the first bracket plate 105a between the first bracket plate 105b and the first hook plate 110a. A second panel 205b is disposed parallel the second bracket plate 105b between the second bracket plate 105b and the second hook plate 110b. The first bracket plate 105a and the second bracket plate 105b are exterior to the join.

In one embodiment, the panels 205 are held in place without fasteners. Instead, the panels 205 may be pushed against the bracket plates 105 by other joins as will be shown hereafter.

Figure 5:
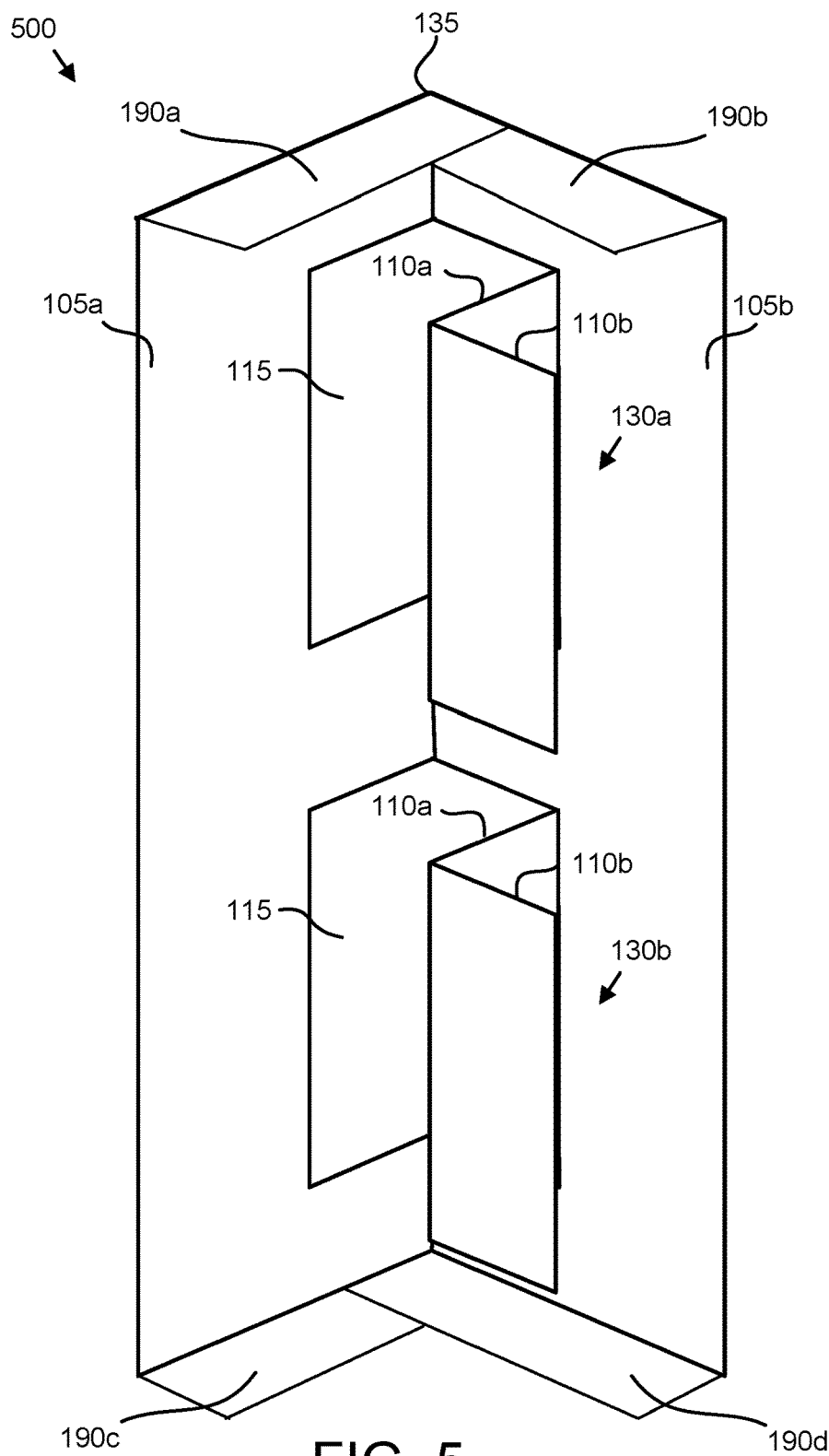
FIG. 5 is a perspective drawing illustrating one embodiment of an assembly joiner with two restraining hooks.

FIG. 5 is a perspective drawing illustrating one embodiment of an assembly joiner 500 with two restraining hooks 130. The description of the assembly joiner 500 refers to elements of FIGS. 1-4, like numbers referring to like elements. Two restraining hooks 130 are shown for a single assembly joiner 500. Although only two restraining hooks 130 are shown for the single assembly joiner 500, one of skill in the art will recognize that any number of restraining hooks 130 may be employed with an assembly joiner 500.

Figure 6:
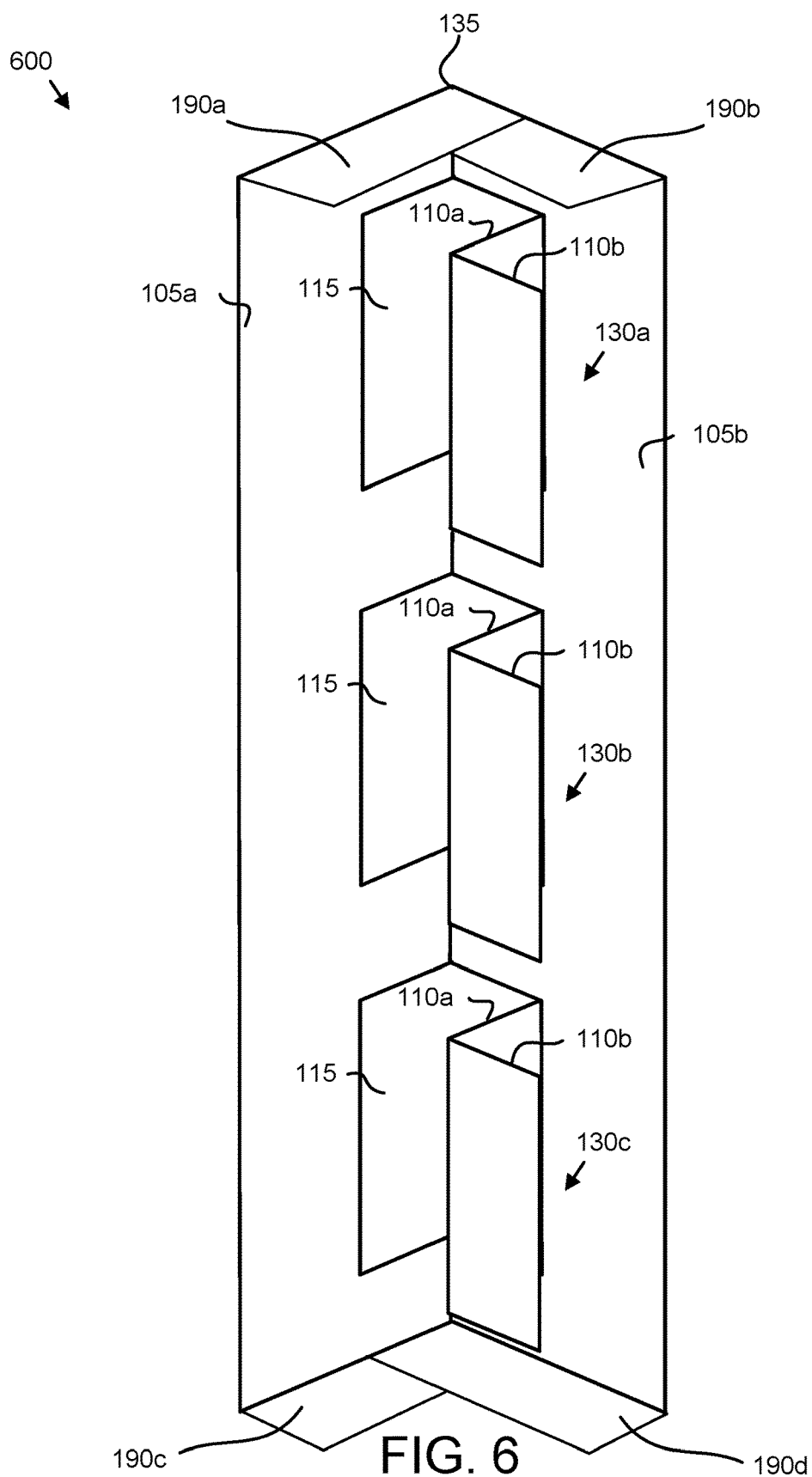
FIG. 6 is a perspective drawing illustrating one embodiment of an assembly joiner with restraining hooks.

FIG. 6 is a perspective drawing illustrating one embodiment of an assembly joiner 600 with restraining hooks 130. The description of the assembly joiner 600 refers to elements of FIGS. 1-5, like numbers referring to like elements. First, second, and third restraining hook 130a-c are shown oriented along the second bracket plate 105b.

Figure 7:
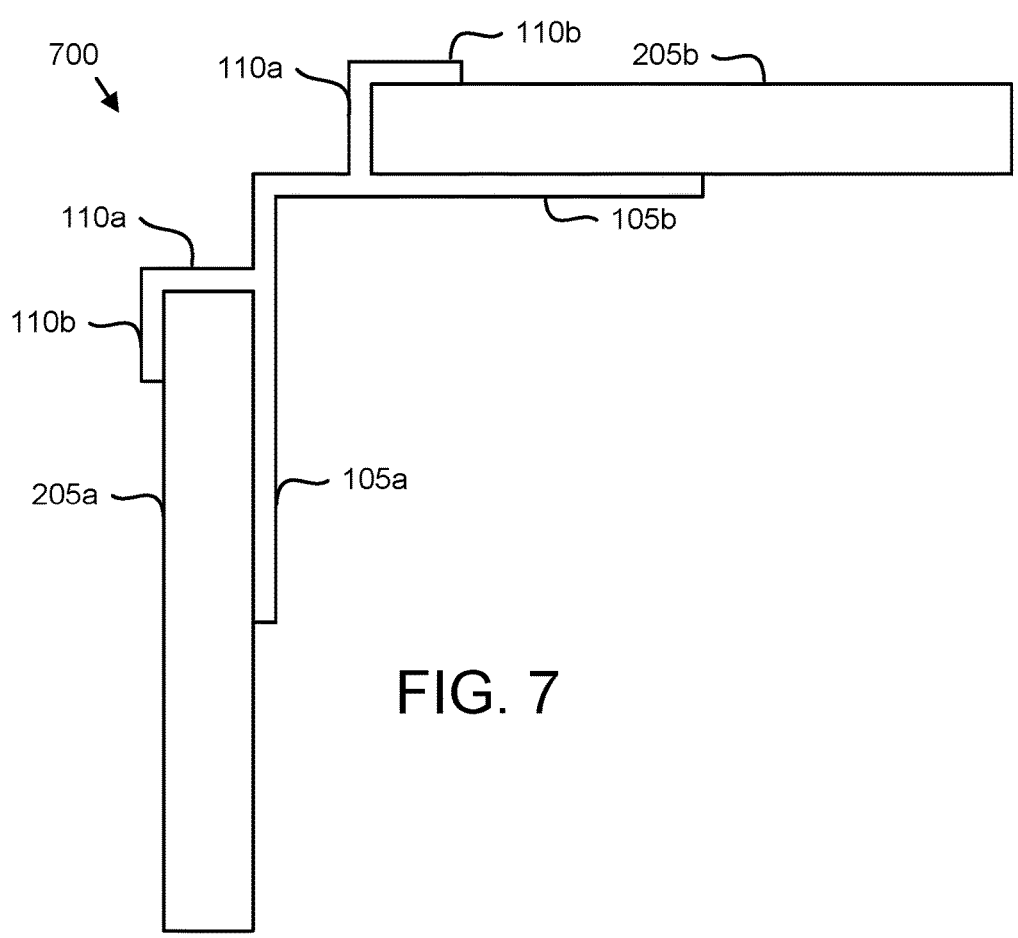
FIG. 7 is a top view drawing illustrating one alternate embodiment of an assembly joiner.

FIG. 7 is a top view drawing illustrating one alternate embodiment of an assembly joiner 700. The description of the assembly joiner 700 refers to elements of FIGS. 1-6, like numbers referring to like elements. The first bracket plate 105a and the second bracket plate 105b are interior to a join of the first panel 205a and a second panel 205b. Hook plates 110 of restraining hooks 130 are shown external to the join. The hook plates 110 may be formed by punching the hook plates 110 from the bracket plates 105.

Figure 8A:
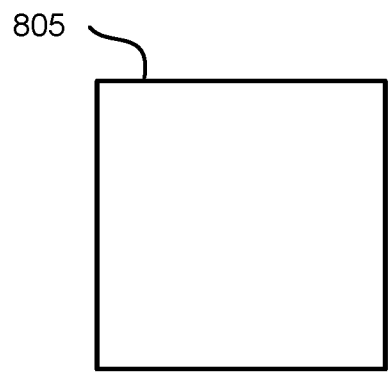
FIGS. 8A-F are top view drawings illustrating embodiments of geometries of assembly joiners and panels.
Figure 8B:
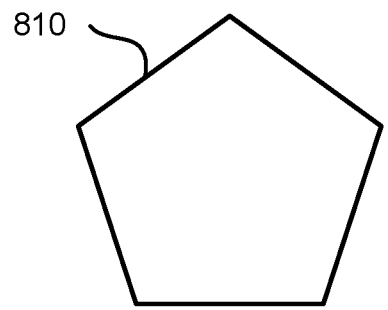
Figure 8C:
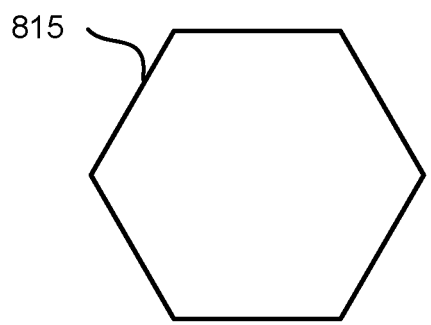
Figure 8D:
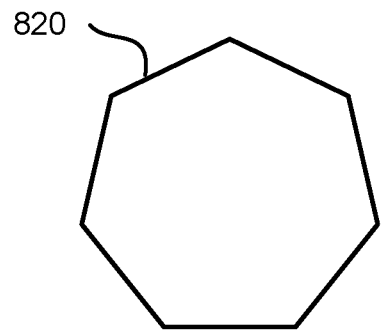
Figure 8E:
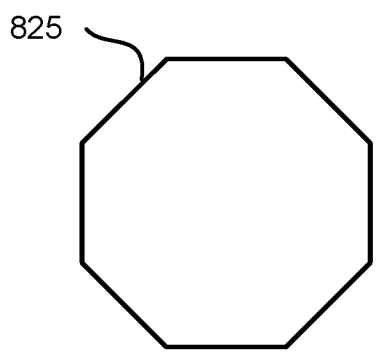
Figure 8F:
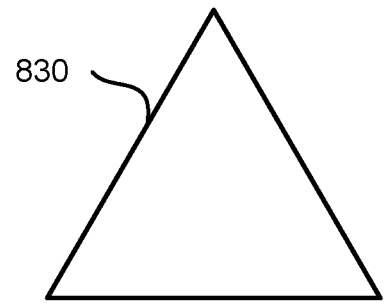

FIGS. 8A-F are top view drawings illustrating embodiments of geometries of assembly joiners 100 and panels 205. FIG. 8A may be constructed with the assembly joiners 100 of FIGS. 1-6. FIG. 8B may be constructed using assembly joiners with interior angles 125 of 72°. FIG. 8C may be constructed using assembly joiners with interior angles 125 of 60°. FIG. 8D may be constructed using assembly joiners with interior angles 125 of 52.4°. FIG. 8E may be constructed using assembly joiners with interior angles 125 of 45°. FIG. 8F may be constructed using assembly joiners with interior angles 125 of 120°. One of skill in the art will recognize that assembly joiners with various interior angles may be used to construct a variety of geometries including irregular geometries.

Figure 9:
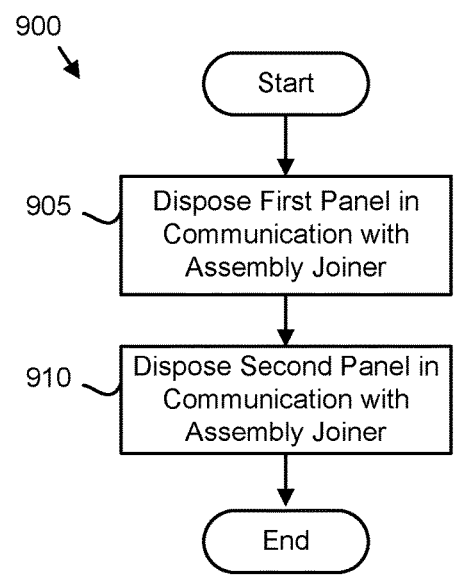
FIG. 9 is a schematic flow chart diagram illustrating one embodiment of an assembly method.

FIG. 9 is a schematic flow chart diagram illustrating one embodiment of an assembly method 900. The method 900 may employ the assembly joiners 100, 500, 600, 700 of FIGS. 1-8. The description of the method 900 refers to elements of FIGS. 1-8, like numbers referring to like elements.

The method 900 starts, and in one embodiment a first panel 205a is disposed 905 in communication with an assembly joiner 100. The first bracket plate 105a is in physical communication with the second bracket plate 105b and disposed at a specified interior angle 125 to the second bracket plate 125. The assembly joiner 100 further comprises a restraining hook 130 in physical communication with the second bracket plate 105b and comprising a first hook plate 110a disposed in physical communication with and substantially perpendicular to the second bracket plate 105a and a second hook plate 110b in physical communication with the first hook plate 110a and disposed substantially parallel to the second bracket plate 105b, the assembly joiner 100 receiving the first panel 205a disposed parallel the first bracket plate 105a between the first bracket plate 105a and the first hook plate 110a.

In addition, a second panel 205b may be disposed 910 in communication with the assembly joiner 100 and the method 900 ends. The assembly joiner 100 may receive the second panel 205b disposed parallel the second bracket plate 105b between the second bracket plate 105b and the second hook plate 110b. The first and second panels 205a-b are secured in relation to each other. As other panels 205 and assembly joiners 100 are added, a solid geometry may be formed as will be shown hereafter.

Figures 10, 11:
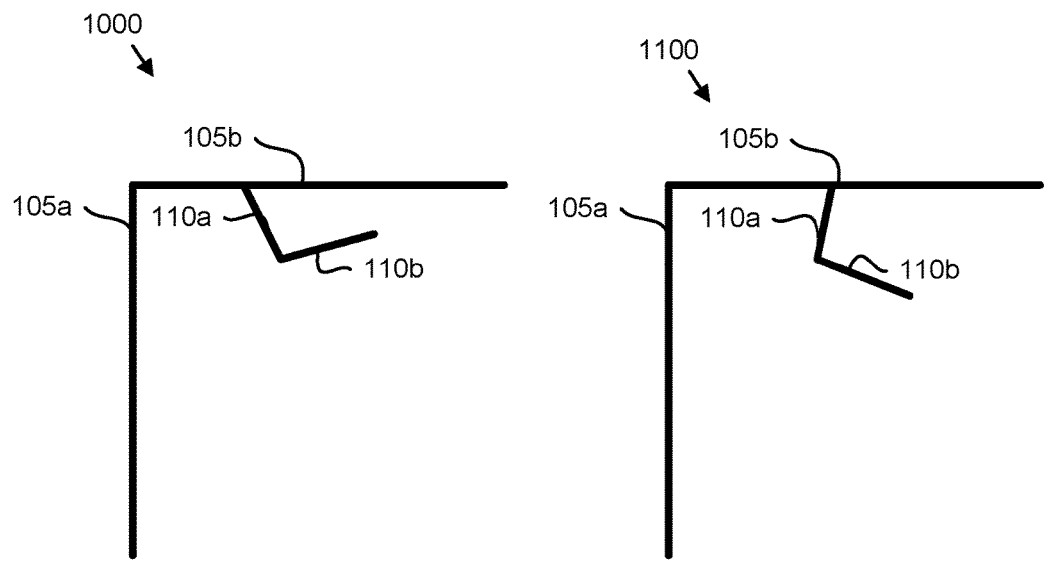
FIG. 10 is a top view drawing illustrating one alternate embodiment of an assembly joiner.
FIG. 11 is a top view drawing illustrating one alternate embodiment of an assembly joiner.

FIG. 10 is a top view drawing illustrating one alternate embodiment of an assembly joiner 1000. In the depicted embodiment, the first hook plate 110a is disposed at an angle to perpendicular from the second bracket plate 105b. In addition, the second hook plate 110b is disposed at an angle to parallel from the second bracket plate 105b.

FIG. 11 is a top view drawing illustrating one alternate embodiment of an assembly joiner 1100. In the depicted embodiment, the first hook plate 110a is disposed at an angle to perpendicular from the second bracket plate 105b. In addition, the second hook plate 110b is disposed at an angle to parallel from the second bracket plate 105b.

Figure 12:
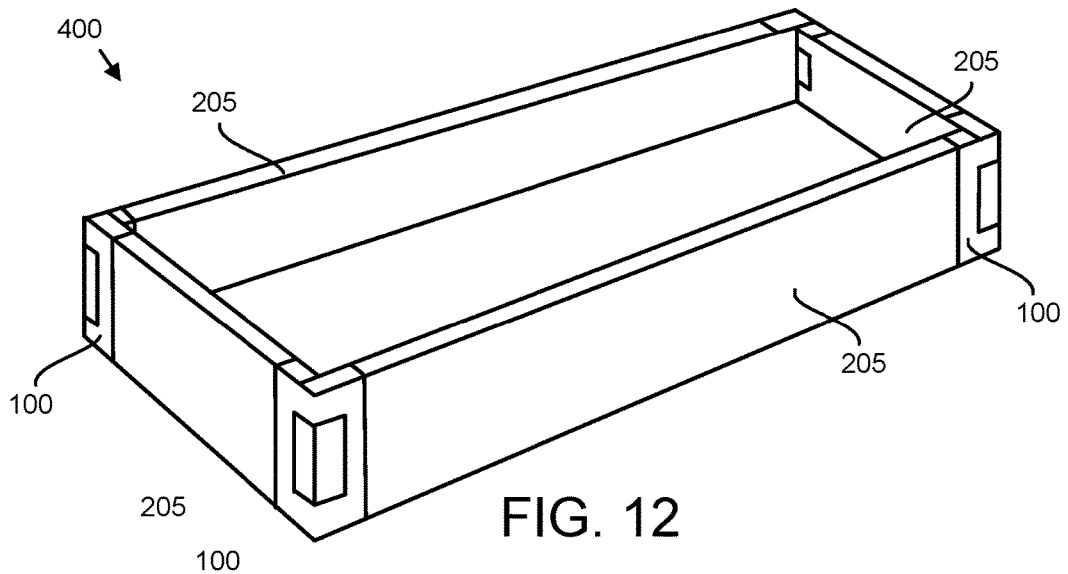
FIG. 12 is a perspective drawing illustrating one embodiment of assembly joiners connecting panels.

FIG. 12 is a perspective drawing illustrating one embodiment of assembly joiners 100 connecting panels 205. The assembly joiners 100 connect the panels 205 to form a box 400. The box 400 in the depicted embodiment may be a garden planter, a concrete form, or the like.

The assembly joiners 100 allow the panels 205 to support each other in maintaining the integrity of the box 400 in both horizontal latitudinal and horizontal longitudinal directions. However, the panels 205 may be easily inserted and removed vertically. Thus a user may quickly connect the panels 205 using the assembly joiners 100. If a panel 205 later needs to be replaced, the user may remove the panel 205 and inserts a replacement panel 205.

Figure 13:
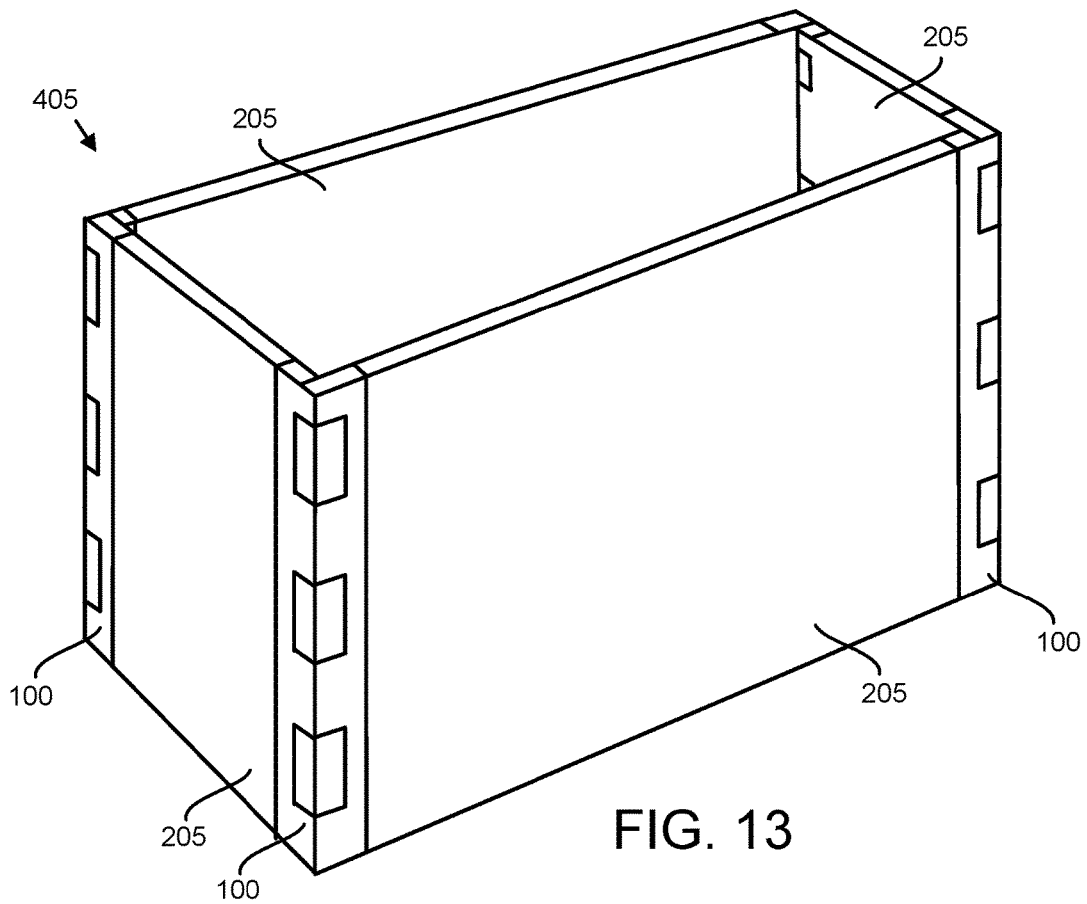
FIG. 13 is a perspective drawing illustrating one alternate embodiment of assembly joiners connecting panels.

FIG. 13 is a perspective drawing illustrating one embodiment of assembly joiners 100 connecting panels 205. The depicted assembly joiners 100 each include a plurality of restraining hooks 130. The assembly joiners 100 securely connect the panels 205 to form the walls an enclosure 405. The enclosure 405 may be provided with roof to former structure, a portion of the structure, or the like.

Figure 14:
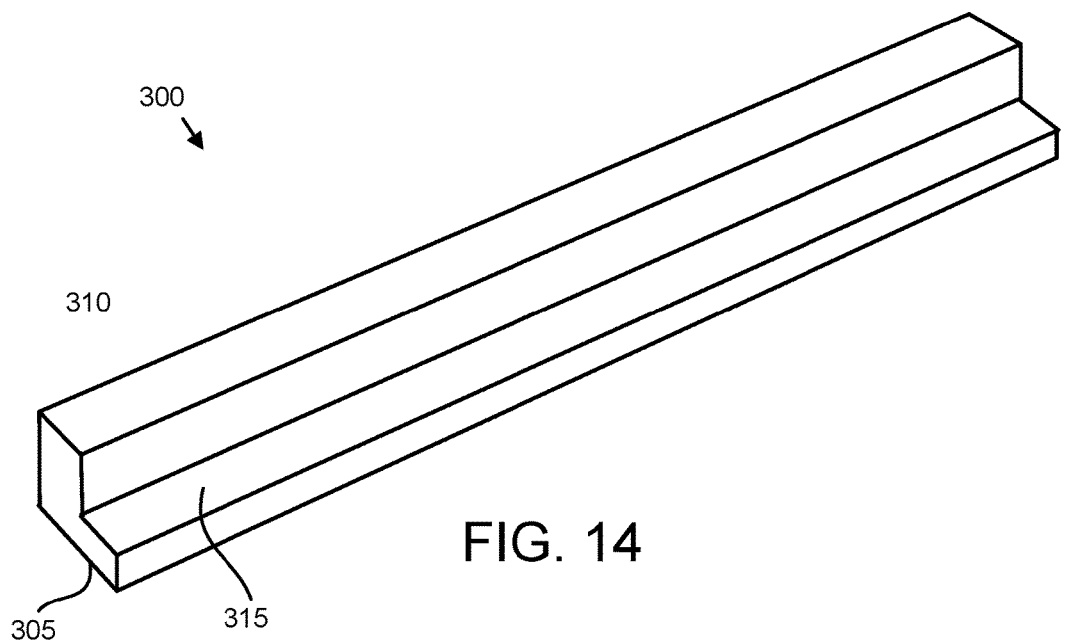
FIG. 14 is a perspective drawing illustrating one embodiment of a stacking ridge.

FIG. 14 is a perspective drawing illustrating one embodiment of a stacking ridge 300. The stacking ridge 300 may be connected to a panel 205. In one embodiment, the stacking ridge 300 is connected to an edge of the panel 205 that is not in contact with the restraining hook 130 of the assembly joiner 100, such as a top edge and/or a bottom edge. The stacking ridge 300 may include a base 305, a ridge 310, and a valley 315. The base 305 may attach to the panel 205. The base 305 may be connected to a panel 205 with a fastener such as a screw, an adhesive, or the like.

The ridge 310 on a first stacking ridge 300 may inter lock with a valley 315 on a second stacking ridge 300 as will be shown hereafter. In the depicted embodiment, the base 305, the ridge 310, and the valley 315 have the same length.

Figure 15:
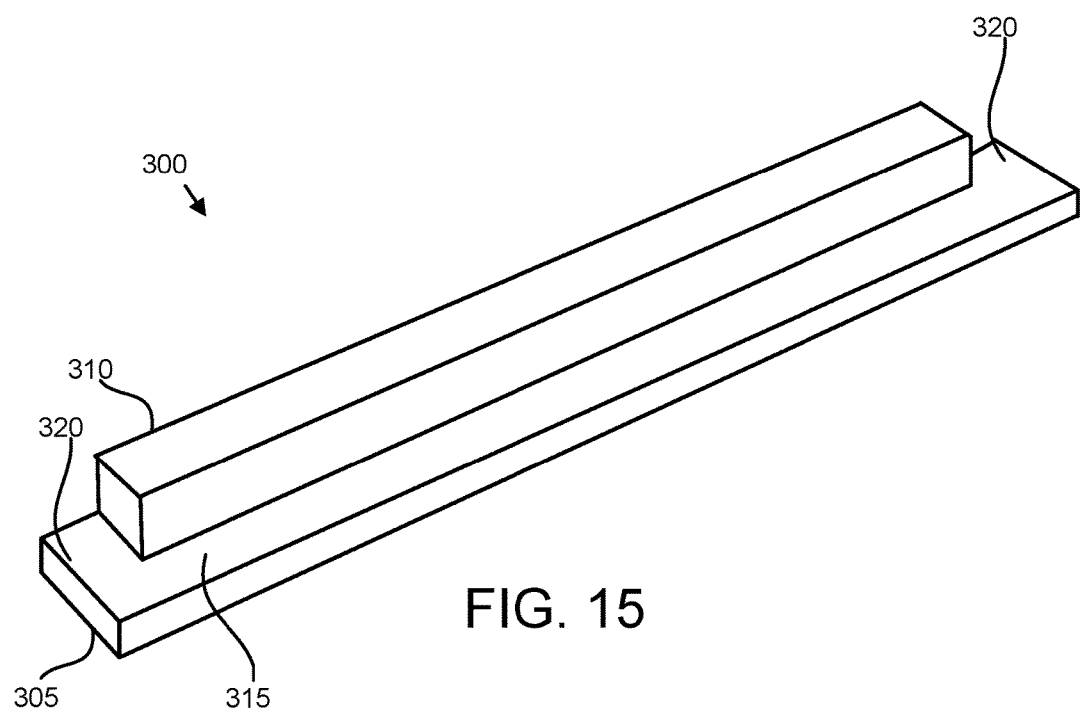
FIG. 15 is a perspective drawing illustrating one alternate embodiment of a stacking ridge.

FIG. 15 is a perspective drawing illustrating one alternate embodiment of a stacking ridge 300. In the depicted embodiment, the base 305 and valley 315 have lengths greater than the ridge 310. One or more notches 320 may be provided to receive the ridge 310 of another stacking ridge 300.

Figure 16:
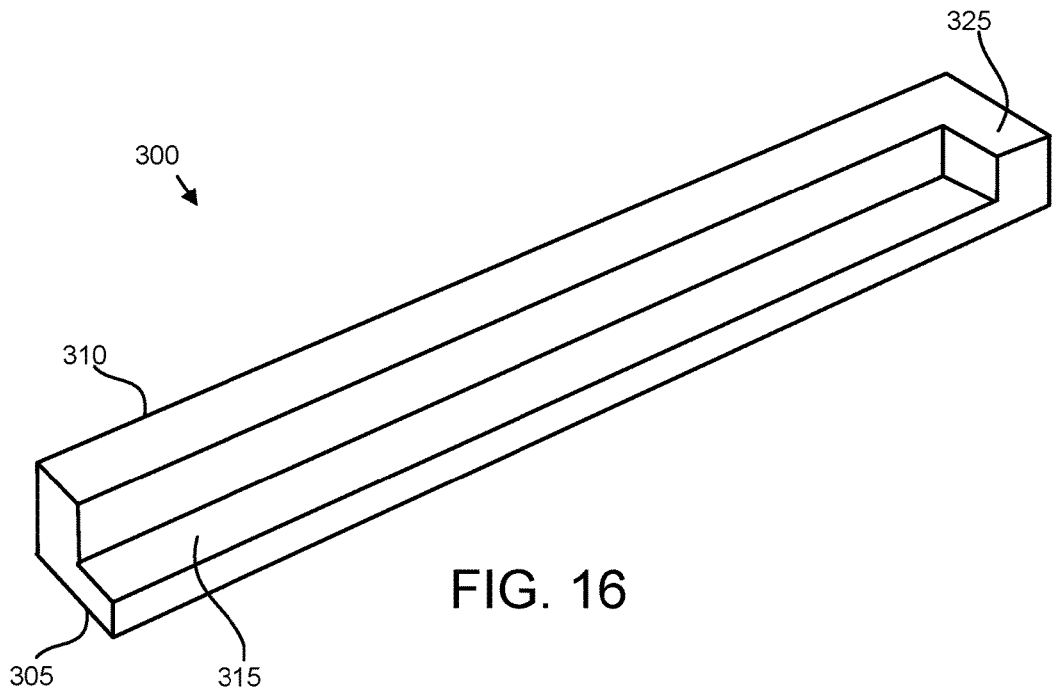
FIG. 16 is a perspective drawing illustrating one alternate embodiment of a stacking ridge.

FIG. 16 is a perspective drawing illustrating one alternate embodiment of a stacking ridge 300. In the depicted embodiment, the ridge 310 is provided with an extension 325. The extension 325 may allow a plurality of stacking ridges 300 to form a continuous set of ridges 310 around the plurality of panels 205.

Figure 17A:
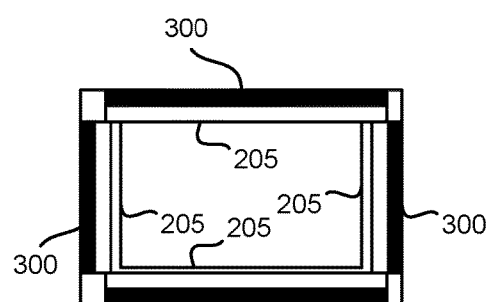
FIG. 17A-D are top view schematic drawings illustrating embodiments of stacking ridge placement.
Figure 17B:
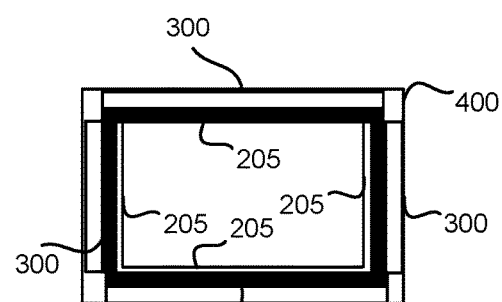
Figure 17C:
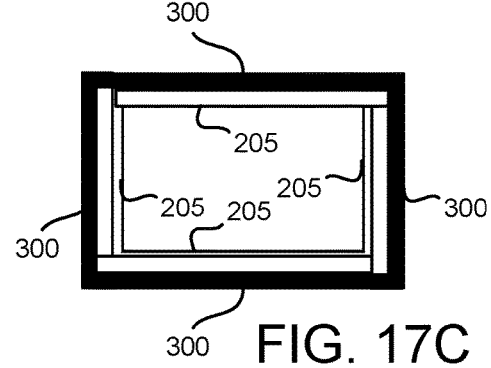
Figure 17D:
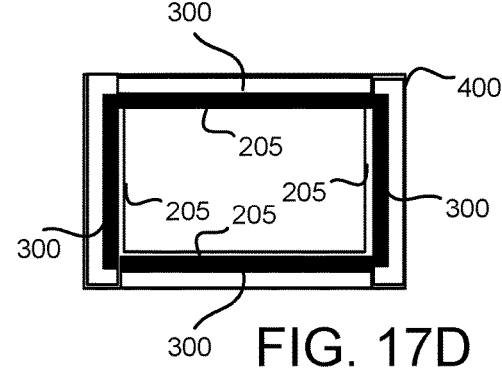

FIGS. 17A-D are top view schematic drawings illustrating embodiments of stack ridge placement. A plurality of panels 205 are shown with the stacking ridge 300 disposed atop each panel 205. In FIG. 17A, the stacking ridge 300 of FIG. 14 is shown, with the ridges 310 disposed towards an outer edge of the panels 205. In FIG. 17B, the stacking ridge 300 of FIG. 14 is shown with the ridges 310 disposed towards an inner edge of the panels 205. In FIG. 17C, the stacking ridge 300 of FIG. 16 is shown with the ridges 310 disposed towards the outer edge of the panels 205. In FIG. 17D, the stacking ridges 300 of FIGS. 14 and 15 are shown with the ridges 310 disposed towards the inner edge of the panels 205.

Figure 18A:
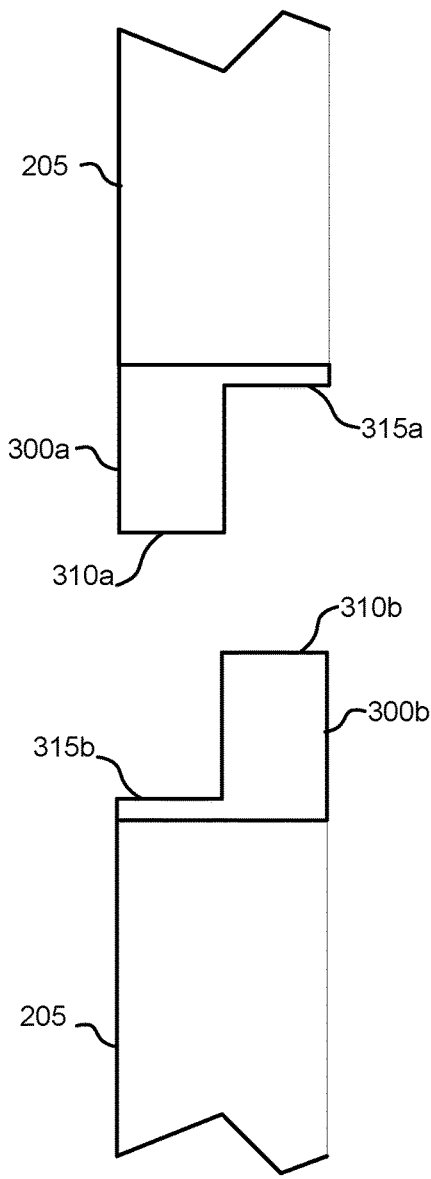
FIGS. 18A-B are side view drawings illustrating one embodiment of stacking ridges.
Figure 18B:
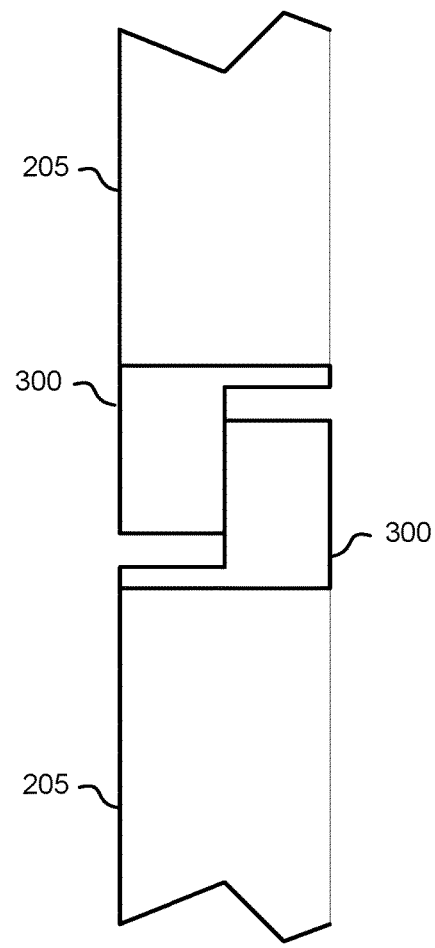

FIGS. 18A-B are a side view drawing illustrating one embodiment of stacking ridges 300. The stacking ridges 300 are arranged so that a valley 315b of a lower stacking ridge 300b receives a ridge 310a of an upper stacking ridge 300a and that a valley 315a of the upper stacking ridge 300 receives the ridge 310b of the lower stacking ridge 300b as shown in FIG. 18B.

Figure 19:
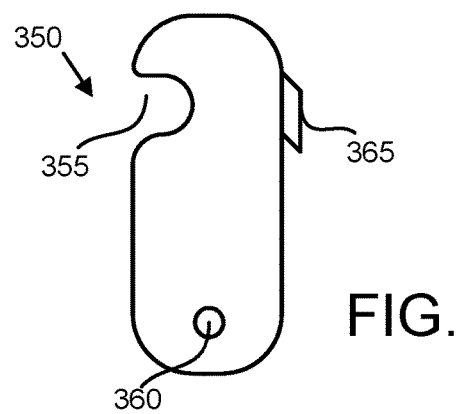
FIG. 19 is a front view drawing illustrating one embodiment of a latch.

FIG. 19 is a front view drawing illustrating one embodiment of a latch 350. The latch 350 includes a pivot 360 and a notch 355. The pivot 360 may be a fastener that passes through the latch 350 and connects with the assembly joiner 100. The notch 355 may receive a catch as will be shown hereafter. In one embodiment, a tab 365 provides a surface for moving the latch 350.

Figure 20:
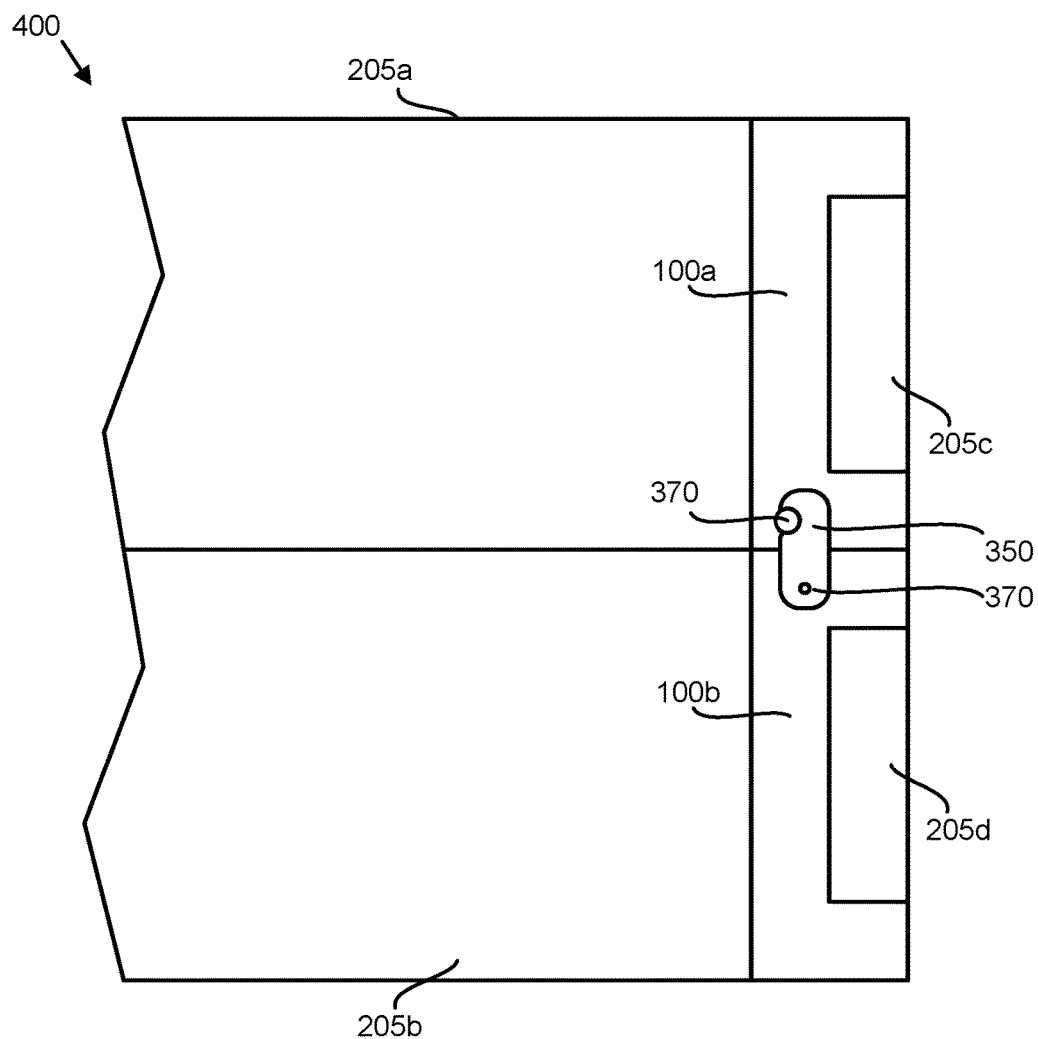
FIG. 20 is a side view drawing illustrating one embodiment of assembly joiners with a latch.

FIG. 20 is a side view drawing illustrating one embodiment of an assembly joiner 100 with latch 350. The latch 350 is connected to a second assembly joiner 100b by the pivot 360. A first assembly joiner 100a is connected to a catch 370. The latch 350 is moved until the notch 355 receives and engages the catch 370, connecting the first assembly joiner 100a to the second assembly joiner 100b. By securing the first and second assembly joiners 100a-b, the latch 350 also secures the first and third panels 205a/c to the second and fourth panels 205b/d.

Figure 21:
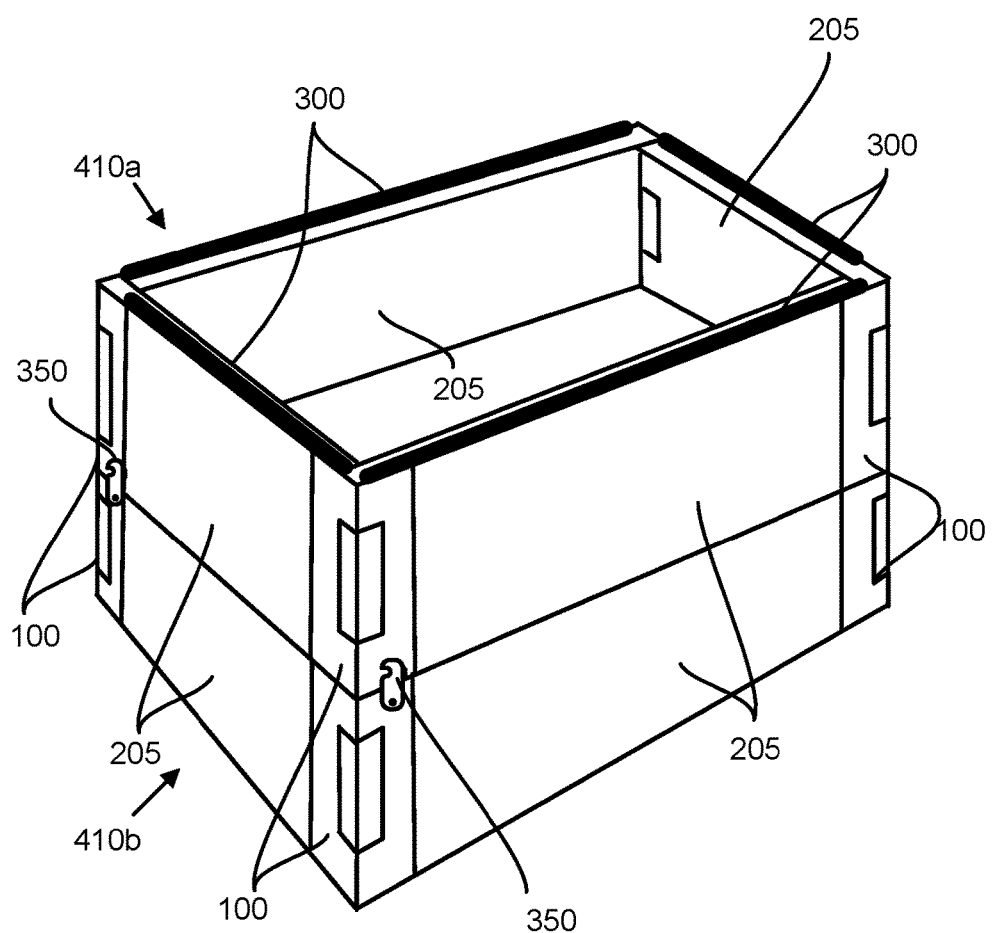
FIG. 21 is a perspective drawing illustrating one embodiment of bee boxes.

FIG. 21 is a perspective drawing illustrating one embodiment of bee boxes 410. Each bee box 410 includes a plurality of panels 205 and assembly joiners 100. The assembly joiners 100 connect the panels 205. Latches 350 are shown disposed on assembly joiners 100. The latches 350 connect lower assembly joiners 100 to upper assembly joiners 100.

Stacking ridges 300 are shown disposed on the top edges of the panels 250 of the upper bee box 410a. The stacking ridges 300 may receive the stacking ridges 300 of another bee box 410. Although not visible, stacking ridges 300 may be disposed between the panels 205 of the upper bee box 410a and the lower bee box 410b.

INDUSTRIAL APPLICABILITY

In general, the structure of the disclosed exemplary embodiments provides a stable reliable apparatus, method, and system for joining panels. Joining panels has traditionally required the modification of the panel ends so that the panels fit together, the use of fasteners with brackets, or the use of fasteners to connect the panels. The modification of the panels or the use of fasteners typically weakens the panels, greatly reducing the panels' life. Panels, particularly wooden panels, frequently fatigue and degrade at the panel ends. With sufficient degradation, the panels may no longer be used. The degradation of panels is particularly expensive in bee boxes. Because the boxes are exposed to the elements (heat and moisture inside the structure, and variant heat and moisture externally) and frequently moved, bee box panel ends degrade rapidly, requiring replacement. Wood naturally wicks out moisture held internally through exposed end grain, which causes failure of traditional fasteners and structure. Traditional fasteners anchor multiple panels by puncturing through one panel, the second anchoring panels has the fastener entering end grain skirting a single tree layer or growth ring. The disclosed embodiments secure wood panels away from weak end grain, through multiple layers of tree ring growth, from both sides of the panel.

The embodiments described herein may join the panels without the need of fasteners or modifications to the panel ends. As a result, damage to the ends of the panels is greatly reduced. The panels typically last for a longer time. In addition, assemblies of the panels employing the embodiments described herein can easily be disassembled for storage or transport. Later, the panels can be assembled again without incurring the additional damage from the use of fasteners.

In one configuration, and assembly joiner includes a bracket and a restraining hook. The bracket may be an inner bracket or an outer bracket. The bracket and restraining hook position two panels relative to each other. Multiple assembly joiners securely hold multiple panels relative to each other without fasteners so that the panels form a stable, secure assembly.

According to one configuration, and assembly joiner is formed from a single piece of plate. A restraining hook may be formed from an outer bracket or inner bracket to secure panels. By forming the assembly joiner from a single piece of plate, the cost of producing a bracket is greatly reduced.

In one configuration, multiple assemblies may be positioned one atop another using stacking ridges. The stacking ridges may include interlocking ridges and valleys. When the ridges and valleys are interlocked, and upper assembly may be securely positioned relative to lower assembly. The stacking ridges eliminate the need to modify panel edges in order to interlock assemblies, reducing damage to the panel edges.

According to one configuration, a latch connects adjacent assembly joiners so that multiple assemblies may be positioned atop one another. The latch allows assemblies to be securely connected without the use of fasteners, so that the assemblies may be easily disconnected and disassembled.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
   a bracket comprising a first bracket plate and a second bracket plate, wherein the first bracket plate is physically connected to the second bracket plate along a corner bend and disposed at a specified interior angle to the second bracket plate;
   a first planar support formed by bending to the first bracket plate inward along a first support outer bend at a substantially right angle to the first bracket plate, wherein the first planar support is disposed toward an interior of the bracket;
   a first inner bracket plate that is bent inward at a first support inner bend from the first planar support, extends from the first support inner bend and is disposed parallel to the first bracket plate over the height of the first bracket plate;
   a first inner planar support formed by bending the first bracket plate outward at a first support base bend of the first inner bracket plate, the first inner planar support receiving a load from first planar support and the first inner bracket plate;
   a second planar support formed by bending to the second bracket plate inward along a second support outer bend at substantially right angle to the second bracket plate, wherein the second planar support is disposed toward an interior of the bracket;
   a second inner bracket plate that is bent inward at a second support inner bend from the second planar support, extends from the second support inner bend and is disposed parallel to the second bracket plate over the height of the second bracket plate;
   a second inner planar support formed by bending the second bracket plate outward at a second support base bend of the second inner bracket plate, the second inner planar support receiving a load from second planar support and the second inner bracket plate;
   a restraining hook in physical communication with the second bracket plate and comprising a first hook plate physically connected and substantially perpendicular to the second bracket plate and a second hook plate physically connected with the first hook plate and disposed substantially parallel to the second bracket plate, wherein the restraining hook, the first bracket plate, the first planar support, the first inner bracket plate, and the first inner planar support receiving a first panel disposed parallel the first bracket plate between the first bracket plate and the first hook plate, and the bracket, the restraining hook, the second bracket plate, the second planar support, the second inner bracket plate, and the second inner planar support receiving a second panel disposed parallel the second bracket plate between the second bracket plate and the second hook plate, wherein an end of the first panel abuts the second bracket plate and an end of the second panel abuts the first hook plate.

2. The apparatus of claim 1, wherein the substantially right angle is substantially 90°.

3. The apparatus of claim 1, wherein the bracket, the restraining hook, and the planar supports are formed from a single piece.

4. The apparatus of claim 3, wherein the restraining hook is punched from the bracket.

5. The apparatus of claim 1, wherein the first and second bracket plates are exterior to a join.

6. The apparatus of claim 1, wherein the bracket, the restraining hook, the planar supports, the inner bracket plates, and the inner planar supports are formed of a material selected from metal, plastic, epoxy resin, corrugated paper, bonded carbon fibers, fabric, epoxy stiffened fabric, concrete, reinforce concrete epoxy concrete, wood, compressed organic material, compressed biodegradable material and combinations thereof.

7. The apparatus of claim 1, wherein the restraining hook, the first bracket plate, the first planar support, the first inner bracket plate, the first inner planar support, the second bracket plate, the second planar support, the second inner bracket plate, and the second inner planar support are formed from a single sheet of metal.

8. The apparatus of claim 7, wherein the restraining hook, the first bracket plate, the first planar support, the first inner bracket plate, the first inner planar support, the second bracket plate, the second planar support, the second inner bracket plate, and the second inner planar support are punched from the single sheet of metal.

* * * * *